(12) United States Patent
Richardson et al.

(10) Patent No.: US 9,877,086 B2
(45) Date of Patent: Jan. 23, 2018

(54) METHOD AND SYSTEM FOR PRODUCING RELEVANCE SORTED VIDEO SUMMARY

(71) Applicant: BriefCam Ltd., Neve Ilan (IL)

(72) Inventors: Eitan Richardson, Modi'in (IL); Shmuel Peleg, Mevaseret Zion (IL)

(73) Assignee: BRIEFCAM LTD., Neve Ilan (IL)

( * ) Notice: Subject to any disclaimer, the term of this patent is extended or adjusted under 35 U.S.C. 154(b) by 0 days.

(21) Appl. No.: 14/605,158

(22) Filed: Jan. 26, 2015

(65) Prior Publication Data

US 2016/0323658 A1    Nov. 3, 2016

Related U.S. Application Data

(60) Provisional application No. 61/931,622, filed on Jan. 25, 2014.

(51) Int. Cl.

| | |
|---|---|
| *H04N 5/93* | (2006.01) |
| *G11B 27/00* | (2006.01) |
| *H04N 21/8549* | (2011.01) |
| *G06K 9/00* | (2006.01) |
| *G11B 27/031* | (2006.01) |
| *G11B 27/10* | (2006.01) |
| *H04N 21/845* | (2011.01) |
| *G06K 9/62* | (2006.01) |
| *G06K 9/32* | (2006.01) |

(52) U.S. Cl.
CPC ..... *H04N 21/8549* (2013.01); *G06K 9/00335* (2013.01); *G06K 9/00718* (2013.01); *G06K 9/00771* (2013.01); *G06K 9/6276* (2013.01); *G11B 27/031* (2013.01); *G11B 27/10* (2013.01); *H04N 21/8456* (2013.01); *G06K 2009/3291* (2013.01)

(58) Field of Classification Search
CPC ................. G06K 9/00718; H04N 21/8549
USPC ......................................... 386/278
See application file for complete search history.

(56) References Cited

U.S. PATENT DOCUMENTS

2010/0092037 A1*  4/2010  Peleg ................. G06F 17/3079
                                                                  382/103
2010/0125581 A1    5/2010  Peleg et al.

FOREIGN PATENT DOCUMENTS

| WO | WO/2007/057893 | 5/2007 |
|---|---|---|
| WO | WO 08/004222 | 1/2008 |

* cited by examiner

*Primary Examiner* — Hung Dang
*Assistant Examiner* — Girumsew Wendmagegn
(74) *Attorney, Agent, or Firm* — Pearl Cohen Zedek Latzer Baratz LLP

(57) ABSTRACT

Method and system for producing relevance sorted video summary are provided herein. The method may include: obtaining a source video containing a plurality of source objects; receiving features descriptive of at least some of the source objects; clustering the source objects into clusters, each cluster including source objects that are similar in respect to one of the features or a combination of the features; obtaining relevance level of the clustered source objects, respectively; generating synopsis objects by sampling respective clustered source objects; and generating a synopsis video having an overall play time shorter than the overall play time of the source video by determining a play time for each of the synopsis objects based at least partially on the respective relevance level.

18 Claims, 6 Drawing Sheets

 
FIG. 4a　　　FIG. 4b
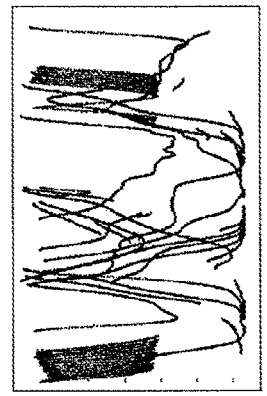 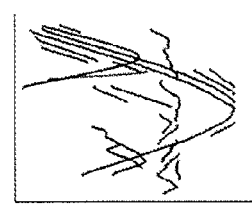
FIG. 4c　　　FIG. 4d
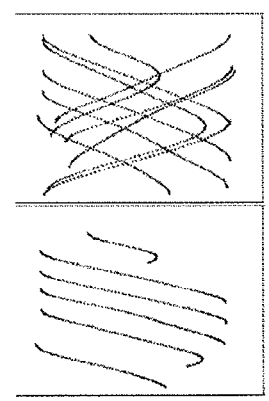 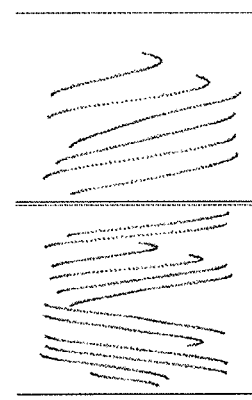
FIG. 5a　　　FIG. 5b
FIG. 5c　　　FIG. 5d

METHOD AND SYSTEM FOR PRODUCING RELEVANCE SORTED VIDEO SUMMARY

CROSS REFERENCE TO RELATED APPLICATIONS

This application claims the benefit of U.S. Provisional Patent Application No. 61/931,622, filed on Jan. 26, 2014, which is incorporated in its entirety herein by reference.

FIELD OF THE INVENTION

The present invention relates generally to the field of video processing, and more particularly to video summarizing and video indexing.

BACKGROUND OF THE INVENTION

Video surveillance cameras have become very popular owing to the low cost of video cameras and disk storage used to record the video and the availability of networked cameras allowing a simple video transfer over the network. Costs have become so affordable that people even install surveillance cameras in private homes. The video generated from most surveillance cameras is recorded in huge video archives.

Most installed video cameras record the video in DVRs (Digital Video Recorders) or NVRs (Network Video Recorders). Normally, no one views the recorded video. Finding activities in video archives presents a significant problem. Automated video analysis approaches for finding activities of interest are making continuous progress, but are still far from giving satisfying solutions. Summarization methods enable more efficient human browsing in video, but create summaries that are either too long or are confusing.

Video analytics systems, which aim at understanding surveillance video, are useful in providing simple alerts. Automatic methods to detect entrance into areas that should be off limits, or to detect crossing from one image region to another image region, provide accurate alerts with almost no errors. But many cases are still too difficult even for the best video analytics systems, while a human observer could have made a fast and accurate decision. Despite much research on the detection of suspicious behavior, for example, human performance is still much better than automatic decisions.

Many different approaches have been proposed for video summarization. Most methods generate a static description, usually as a set of keyframes. Other methods use adaptive fast forward, skipping irrelevant periods.

WIPO Application Publication No. WO 07/057893 discloses a method for creating a short video synopsis of a source video wherein a subset of video frames is obtained in a source sequence that show movement of at least one object that is a connected subset of pixels from at least three different frames of the source video. At least three source objects are selected from the source sequence, and one or more synopsis objects are temporally sampled from each selected source object. For each synopsis object, a respective display time is determined for starting its display in the synopsis video, and the video synopsis is generated by displaying selected synopsis objects each at its respective predetermined display time without changing the spatial location of the objects in the imaged scene, such that at least three pixels, each derived from different respective times in the source sequence, are displayed simultaneously in the synopsis video.

WIPO Application Publication No. WO 08/004222 describes an extension to this approach that is adapted for the generation of a video synopsis from a substantially endless source video stream as generated by a video surveillance camera. Object-based descriptions of at least three different source objects in the source video stream are received in real time, each source object being a connected subset of image points from at least three different frames of the source video stream. A queue of received object-based descriptions is continuously maintained and includes for each respective source object its duration and location. A subset of at least three source objects is selected from the queue based on given criteria, and one or more synopsis objects are temporally sampled from each selected source. For each synopsis object, a respective display time for starting its display in the video synopsis is determined, and the video synopsis is generated by displaying selected synopsis objects or objects derived therefrom each at its respective predetermined display time, such that at least three points, each derived from different respective times in the source video stream, are displayed simultaneously in the synopsis video, and at least two points, both derived from the same time, are displayed at different times in the video synopsis.

WIPO Application Publication No. WO 08/004222 also discloses indexing the video synopsis by clustering objects into clusters of similar objects. This facilitates browsing of the video synopsis and may be done using any clustering method, for example by building an affinity (similarity) matrix based on some similarity measure between every pair of objects.

US Patent Application Publication No. 2010/0125581 discloses an improved clustering method that may be used with any type of video synopsis method, regardless of whether the video synopsis is finite or substantially endless.

US Patent Application Publication No. 2010/0125581 builds upon video summarization approaches that simultaneously display activities which originate from different times. These methods tend to create confusing summaries by mixing together different activities, and the invention proposes prior clustering of the activities into similar clusters. Such an approach achieves three benefits for video summaries: (i) Similar activities pack together more efficiently into shorter video summaries. (ii) These summaries are very clear, as it is easy to view multiple similar activities. (iii) Irregular activities are easier to detect. In addition to simple video summarization, clustered summaries can help in structured browsing of objects, and in preparing samples for training classifiers. The accuracy of classifiers can be checked as well on thousands of objects.

SUMMARY OF THE INVENTION

Some embodiments of the present invention provide a method and system for presenting video summaries that are sorted by their relevance to a search by a user. Like a Google search that presents the most relevant results first and the less relevant results later, this invention described the generation of video summaries such that the more relevant search result are likely to appear before the less relevant search result. This ordering by relevance may be carried out per object, in which case object can appear simultaneously even when they appeared in different time at the original video. Alternatively, this ordering can be done to selected groups of frames, such that frames showing relevant activities are likely to appear before frames showing less relevant activities.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 4A to 4D show selection of similar objects using a nearest neighbor approach in accordance with some embodiments of the present invention;

FIGS. 5A to 5D show motion trajectories of objects in accordance with some embodiments of the present invention;

Figures 1A, 1B:
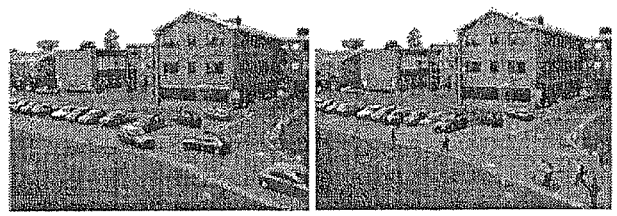
FIGS. 1A to 1D show results of unsupervised spectral clustering using appearance features for a video from the PETS database in accordance with some embodiments of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Activities

One of the basic elements used by the invention is an activity, which is simply a dynamic object. The object is detected in a sequence of frames, and each activity is therefore represented by a sequence of object masks in those frames. In addition to the object mask in each frame, an object has a rectangular bounding box called the ROI (Region of Interest). The information for each activity Ai includes the following:

$$A_i = (t_s^i, t_e^i, \{M_t^i, R_t^i\}_{t_s \le t \le t_e}) \qquad (1)$$

where $t_s$ and $t_e$ are the start and end frames for this activity, $M_t$ is the object mask for frame t which includes pixel colors, and $R_t$ is the ROI for frame t.

Activity Extraction

Any method that can produce the activity description of object masks along video frames as in Eq. (1) is suitable for clustered summarization. There are numerous methods that segment moving objects fairly well. In one embodiment, a simplification of a known method was used to compute activities. This method combines background subtraction together with min-cut to get segmentation of moving objects. But other methods for the detection of moving objects are also suitable.

Tubelets: Short Activity Segments

In order to enable the analysis of objects performing multiple activities, objects can be broken into sub-parts called "tubelets". Tubelets have a predefined maximal length (we use 50 frames), and can overlap with other tubelets (we use 50% overlap between tubelets). The division into tubelets has the following benefits:

Activities vary substantially in length. By breaking into tubelets we compare activities of similar lengths.

Long activities may be composed from parts having different dynamics. Tubelets are more likely to have a single, simple, motion.

Different objects may intersect in the video frames, creating complex activities composed from different objects. Most tubelets include a single object since they are shorter.

After clustering the tubelets, overlapping tubelets that were clustered together are merged into a longer activity.

Activity Features

Features that can be used for clustering include appearance (image) features and motion features. SIFT descriptors were found to be highly discriminative, and in one embodiment the SIFT descriptors were used as appearance features. For each object, multiple SIFT features are computed inside the object masks in the relevant frames. This large collection of SIFT features can be used to estimate appearance similarity between objects. For efficiency, we can randomly select a predetermined number of features for the initial unsupervised clustering. In some embodiments reduced to practice, 200 SIFT features were selected from each activity.

For representing the motion of objects, we can use the smooth trajectory of the center of the object. The trajectory of an object (activity) $A_i$ is a sequence of frame by frame features, including for every frame t at least three features: $x_t^i, y_t^i, r_t^i$ which represent the x, y coordinates of the centroid of the object, as well as the radius of the object. Shorter motion descriptors can be used by sampling fewer frames from the activity.

Similarity Between Activities

In order to cluster together similar activities, a distance metric between activities is needed. A symmetric distance between activities is needed for use in spectral clustering that will be used below. In some experiments a distance based on two components, as described in this section has been used: (i) Features that are derived from the shape of the objects (Eq. 2), and features that are derived from the motion of the objects (Eq. 6).

Appearance Distance

For the appearance distance between two activities, we use the NN (Nearest Neighbor) estimate computed from the distance between their SIFT descriptors. As a distance between SIFT descriptors, we use a simple squared distance, but other distances can be used as well. Let $S_k^i$ be the k's SIFT descriptor of activity $A_i$, and let $\tilde{S}_k^j$ be the SIFT descriptor in $A_j$ closest to $S_k^i$. Similarly, $\tilde{S}_k^i$ is the closest descriptor in $A_i$ to $S_k^j$.

The appearance distance $Sd_{ij}$ between activities $A_i$ and $A_j$ is:

$$Sd_{ij} = \frac{1}{2N}\left(\sum_k |S_k^i - \tilde{S}_k^j| + \sum_k |S_k^j - \tilde{S}_k^i|\right) \tag{2}$$

where N is the number of SIFT descriptors in each activity. This measure follows the nearest neighbor distance promoted in [2], which we found to be very effective in our experiments.

Motion Distance

Motion similarity between two activities is especially useful for the construction of summaries that display simultaneously multiple objects. Given two activities $A_i$ and $A_j$, we compute a motion distance between them for all temporal shifts k of $A_j$. Let $l_x$ be the time length of activity $A_x$, let $T_{ij}(k)$ be the time period common to $A_i$ and to $A_j$ after the latter has been temporally shifted by k, and let $$w(k) = \frac{\min(l_i, l_j)}{T_{ij}(k)} \tag{3}$$

be a weight encouraging a long temporal overlap between temporally shifted activities.

The separation between the activities is:

$$Sep_{ij}(k) = \sum_{t \in T_{ij}(k)} \left[(x_t^i - x_{t+k}^j)^2 + (y_t^i - y_{t+k}^j)^2\right] \tag{4}$$

The motion distance between $A_i$ and the shifted $A_j$ is defined as follows:

$$Md_{ij}(k) = \frac{w(k)}{T_{ij}(k)} sep_{ij}(k) \tag{5}$$

The elements in the motion distance $Md_{ij}(k)$ minimize the spatial separation between the activities (4), and increase the temporal overlap between the activities as represented by w (3). Dividing by the temporal overlap $T_{ij}(k)$ is normalization to a "per frame" measure.

When the motion distance between two activities should not depend on the object location in the image, the two centroids are computed for the respective activities in $T_{ij}(k)$, the time period common to the two activities. The two objects are spatially shifted to a common centroid before computing $Md_{ij}(k)$ (Eq. 5). The final motion distance between $A_i$ and $A_j$ is a minimum over all temporal shifts k:

$$Md_{ij} = \min_k Md_{ij}(k) \tag{6}$$

Unsupervised Clustering

For unsupervised clustering we use a distance measure Dij defined between activities $A_i$ and $A_j$ from the appearance distance $Sd_{ij}$ (Eq. 2) and the motion distance $Md_{ij}$ (Eq. 6).

$$D_{ij} = \alpha Sd_{ij} + (1-\alpha) Md_{ij} \tag{7}$$

The parameter $\alpha$ control the preference between motion and appearance. From Dij an affinity matrix M is generated:

$$M(i,j) = M(j,i) = \exp(-D_{ij}/\sigma) \tag{8}$$

where $\sigma$ is a constant scale factor used for normalization. The normalized-cut approach is used to cluster the data given the affinity matrix M. We used doubly stochastic normalization of the input affinity matrix to improve spectral clustering results. Examples showing the results of clustering are shown in FIGS. 1 and 2 both of which show results of unsupervised spectral clustering using appearance and motion.

Figures 1C, 1D:
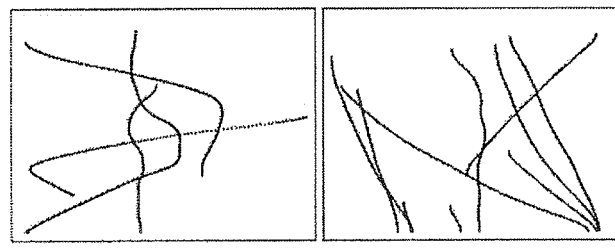

In FIGS. 1a-1d, people and cars are separated well into two clusters, one cluster for people (FIGS. 1b and 1d) and another cluster for cars (FIGS. 1a and 1s). FIG. 1a and FIG. 1b show two frames from the two summaries made from a single cluster, and FIGS. 1c and 1d show motion paths of the objects in the displayed cluster, each object being shown as a curve in x-t.

Figures 2A, 2B:
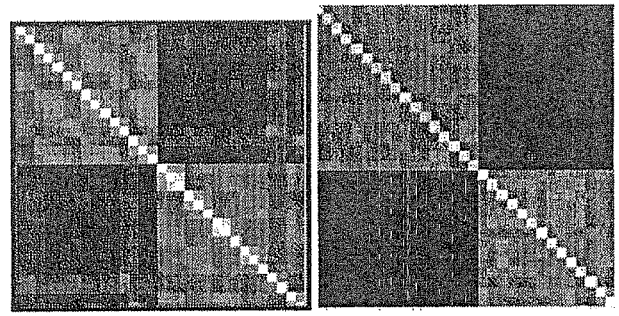
FIGS. 2A to 2F show results of unsupervised spectral clustering using appearance and motion in accordance with some embodiments of the present invention.
Figures 2C, 2D:
Figures 2E, 2F:
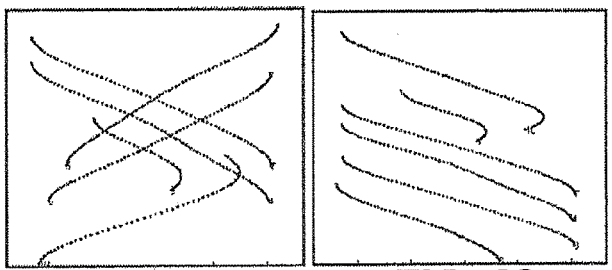

In FIGS. 2a-2f, the left column (FIGS. 2a, 2c and 2e) uses only the appearance features, and the right column FIGS. 2b, 2d and 2f) uses only the motion features. FIGS. 2a and 2b show affinity matrices after clustering to two classes. FIG. 2c shows an image from a summary generated from one cluster (appearance features) while FIG. 2d shows an image from a summary generated from the other cluster (motion features). FIGS. 2e and 2f show motion paths of the objects in the displayed cluster, each object being shown as a curve in x-t. The shape cluster (FIG. 2e) picks up objects having uniform appearance as shown in FIG. 2c, while the motion cluster (FIG. 2f) picks up objects having similar motion (FIG. 2d).

Performing unsupervised clustering on one set of features can be followed by taking the resulting clusters, and on each cluster performing clustering using a different set of features. This is shown in FIG. 3, where two SIFT clusters were first generated, and on each SIFT cluster motion clustering has been applied. This resulted in four clusters, each having different appearance and motion.

Figures 3A, 3B:
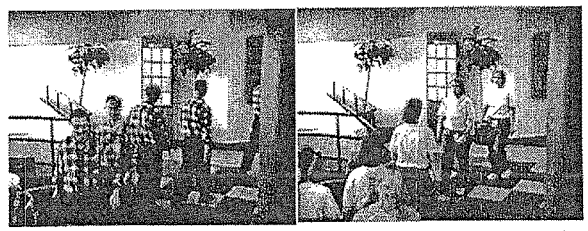
FIGS. 3A to 3L show performing two steps of unsupervised spectral clustering in accordance with some embodiments of the present invention.
Figures 3C, 3D:
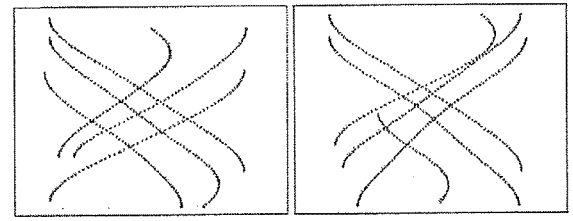
Figures 3E, 3F:
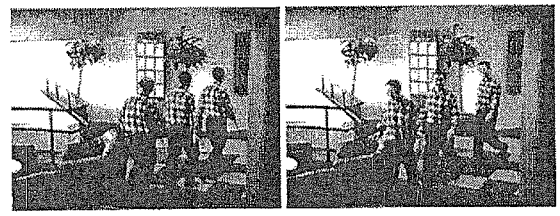
Figures 3G, 3H:
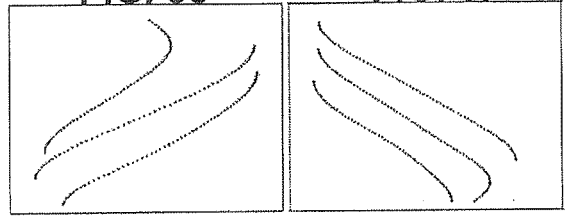
Figures 3I, 3J:
Figures 3K, 3L:
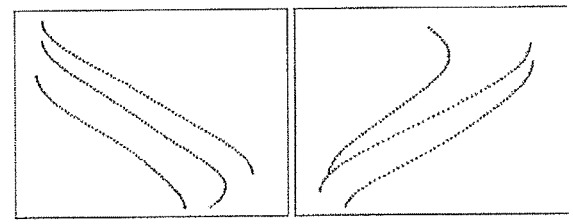

FIGS. 3a and 3b show two SIFT-based clusters, with a good separation between the man (FIG. 3a) and the woman (FIG. 3b). FIGS. 3c and 3d show the motion paths of the clusters in FIGS. 3a and 3b as curves in x-t. FIGS. 3e and 3f show further clustering on the man cluster using motion features. The man walking left (FIG. 3f) and the man walking right (FIG. 3e) are the two new clusters. FIGS. 3g and 3h show their respective motion paths. FIGS. 3i and 3j show further clustering on the woman cluster using motion features. The woman walking left (FIG. 3i) and the woman walking right (FIG. 3j) are the two new clusters. FIGS. 3k and 3l show their respective motion paths.

Creating Summaries

Given a set of objects or activities, we would like to create a summarization video displaying these objects with minimal length and minimum collisions between them. This is done by assigning each object its start play time in the summary. This mapping from objects to play times is performed in three stages:

1. Objects are clustered based on the packing cost (Eq. 11);
2. Play time is assigned to objects within each cluster. This play time can be ordered such that more relevant objects are likely to be played before less relevant objects.
3. Play time is assigned to each cluster. The play time can be ordered such that more relevant clusters are likely to be played before less relevant clusters.

These steps will be described in detail in this section. Once each object is assigned its play time, the output summary can be generated by playing the objects over the background at the assigned times. For example, the video used in FIGS. 1a and 1b was originally 5 minutes long, and using clustered synopsis the summary including all activities was about 20 seconds long.

Another example for simple browsing of surveillance video is shown in FIGS. 4a to 4d where similar objects are selected using a nearest neighbor approach. In viewing the video, the user prefers to watch only the people, or only the cars. The fastest approach is to select a few objects in the desired class, and pick up appropriate similar objects using a nearest neighbor approach, and display in a video summary. Object display can be ordered, of courses, such that objects more similar object to the selected objects are played before less similar objects.

FIG. 4a shows objects found to be closest to two selected cars, while FIG. 4b shows objects found to be closest to two selected people. FIG. 4c shows motion trajectories of the cars in the summary and FIG. 4d shows motion trajectories of the people in the summary.

Packing Cost

The packing cost between two activities should indicate how efficiently the activities could be played together. The activities should have similar motion, and for some temporal shift they should play simultaneously with minimal collisions and with minimal increase of the length of the video.

The packing cost is very similar to the motion distance in Sec. 3.2, with the following modifications (i) There is no spatial shift of the activities. (ii) A collision cost $Col_{ij}(k)$ is added between objects, defined as follows:

$$Col_{ij}(k) = \sum_{t \in T_{ij}(k)} |(x_t^i - x_{t+k}^j)^2 + (y_t^i - y_{t+k}^j)^2 < (r_t^i)^2 + (r_{t+k}^j)^2| \quad (9)$$

where $r_t^i$ is the radius of object $A_i$ in frame t, and $r_{t+k}^j$ is the radius of $A_j$ in frame t+k. $Col_{ij}(k)$ counts the number of collisions for the temporal shift k, where a collision occurs when the separation between the object centers is smaller than the sum of the radiuses of the two objects.

The packing cost for temporal shift k is defined using the motion distance (5) and the collision cost (9):

$$Pk_{ij}(k) = \alpha Md_{ij}(k) + \beta Col_{ij}(k) \quad (10)$$

Finally, the packing cost for the two activities is the minimum over all temporal shifts:

$$Pk_{ij} = \min_k Pk_{ij}(k) \quad (11)$$

The packing cost $Pk_{ij}$ between two objects is used for clustering before arrangement into the video summary. FIG. 5 is an example for the clustering into three clusters of a set of objects based on the packing cost.

FIG. 5a shows motion trajectories of all input objects as curves in x-t. FIGS. 5b-5c show motion trajectories of two clusters using the packing cost. FIG. 5d shows motion trajectories of a complete summary. It should be noted that there are no confusing intersections.

Object Arrangement within Cluster

Once the objects are clustered based on the packing cost of Eq. (11), each cluster contains objects that can be packed efficiently. In order to create a summary video from all objects in such a cluster, we need to determine the starting play times for all objects. These starting play times should generate a short but easy to watch video. Since all objects in a cluster already have a similar motion, we need to determine the play time to minimize both total playing time but also minimize collisions between objects. This is done using the packing cost as defined in (10). In addition to optimal packing, relevance cost can be added. The relevance cost favors the display of more relevant objects before less relevant objects. This relevance cost can be better similarity to the attributes of the search as defined by a user, better similarity to the cluster's center, etc. Since optimal packing is a difficult problem, we use the following optimization which gives good results.

We can start with an empty set G of objects with temporal mapping. Determining the mapping of each object into its play time starts with the object having the longest duration, which is placed arbitrarily, and added to G. We continue with the longest object outside G, and determine its time mapping k as the time mapping which minimizes the sum over all its frames of the packing costs $Pk_{ij}(k)$ between the current object and the object in G closest to it in each of the frames. In this computation, the temporal overlap $T_{ij}(k)$ is the temporal overlap with the set G. Every object is added to G after its time mapping has been determined. This temporal mapping continues until all objects are mapped into play time. An example of such temporal arrangements is shown in FIGS. 5b-d.

We compute the packing costs $Pk_{ij}(k)$, which involves computing the collisions of one object with the nearest object from a collections of objects, using the efficient approximate k-nearest neighbors algorithm and kd-tree implementation of [6]. The expected time for a NN search is logarithmic in the number of elements stored in the kd-tree.

Combining Different Clusters

The combination of different clusters is done similarly to the combination of individual objects. While objects in a cluster have their relative playing time, we need to assign to each cluster a global playing time. This is done similar to assigning time to individual objects. An arbitrary playing time is assigned to the cluster having maximal number of objects. We continue by taking the largest cluster with unassigned playing time, and assign to it a global time minimizing collision with the clusters whose time has already been assigned.

Alternatively, clusters may be sorted by relevance. User may define some search criteria, and the clusters most similar to the search criteria will be likely to display before clusters less similar to the search criteria.

Training and Testing Supervised Classifiers

Training a supervised classifier, e.g. SVM, requires a large training set of tagged samples. Building such a large training set is especially time consuming for surveillance video, as there are thousands of objects to classify. Clustered summaries can make the building of the training set fast and efficient.

One possible approach for building the training set is the use of unsupervised clustering to create approximate clusters. Another approach can be the tagging of a single sample, and using a nearest neighbor approach to tag other samples. While these approached can create quickly large training sets, they have errors that need to be corrected. Clustered summaries can display in a very short time the created sets, allowing the creation large and accurate training sets with minimal effort and time.

Once a working classifier has been trained, a clustered summary is the most efficient way to test its performance. The alternative of spending many hours to watch the resulting classification is not practical.

The training set for the example in FIG. 6 has about 100 tubelets. Instead of tagging 100 tubelets individually, unsupervised clustering allowed the creation of the training set with only 10 key clicks following unsupervised clustering.

Figure 6A:
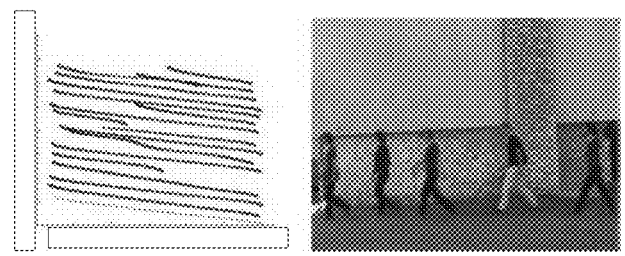
FIGS. 6A to 6E show clustered summaries of SVM classification in accordance with some embodiments of the present invention.
Figure 6B:
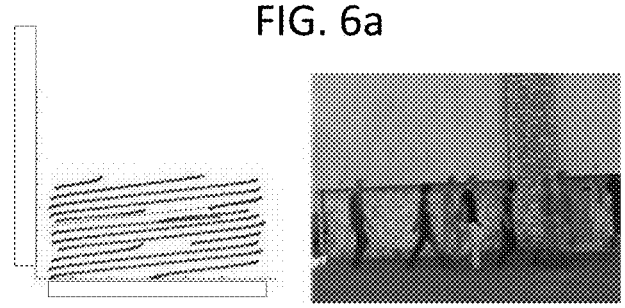
Figure 6C:
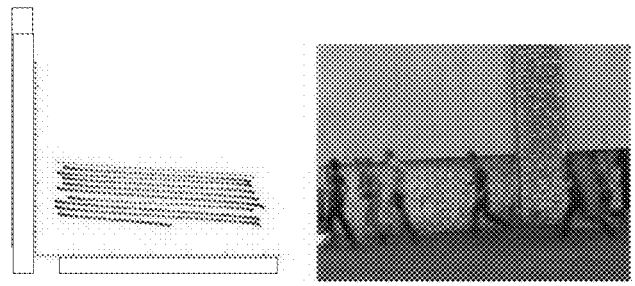
Figure 6D:
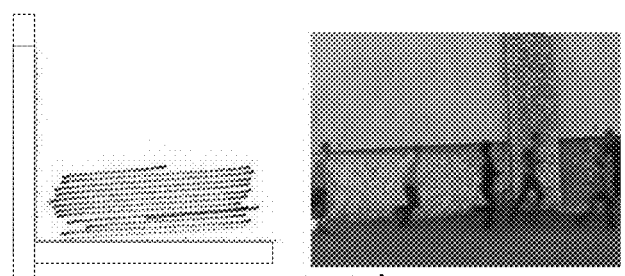
Figure 6E:
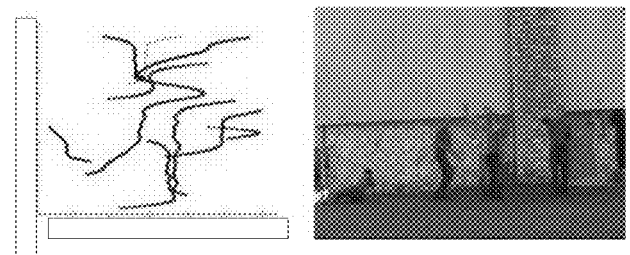

FIGS. 6a to 6e shows clustered summaries of the SVM classification of 100 tubelets using motion features. A simple view of the classification results, assuming 10 seconds for each tubelet, takes about 20 minutes, while the length of the clustered summary is less than 2 minutes. The left column is the motion trajectory of the objects, and the right column is one frame from the clustered summary. The classes are as follows: FIG. 6a walking left; FIG. 6b walking right; FIG. 6c running left; FIG. 6d running right; and FIG. 6e standing and waving.

CONCLUDING REMARKS

The relevance ordered summaries methodology according to the invention serves as an efficient method to browse and search surveillance video. Surveillance videos are very long (actually they are almost endless), and include many thousands of objects. Regular browsing is practically impossible. In relevance ordered summaries, multiple objects having similar motion can be shown simultaneously. This enables to view all objects in a much shorter time, without losing the ability to discriminate between different activities. Summaries of thousands of objects can be created in a few minutes (not counting object extraction time). In addition, similar to Google search, relevant object can appear ahead of less relevant objects.

Clustered summaries can also be used for video browsing. Instead of a user having to spend many hours to watch the captured video, the relevance ordered summaries methodology enables a user to browse the video archive quickly and efficiently and focus on a smaller set of interesting objects. Browsing can be done by hierarchical application of relevance ordered summaries. The user first selects an interesting object, and then zooms-in on similar objects to the selected object. Objects can always be played according to their relevance. One example of relevance is the distance of each object, in feature space, from the selected object. Or the user can select irrelevant objects, and objects similar to these irrelevant objects could be placed later in the summary, or even removed from the summary. The user may continue browsing by "cleaning" the summary using a supervised classifier, or by simply selecting some nearest neighbors to the relevant objects (or reducing relevance based on distance from the irrelevant objects).

Figure 7:
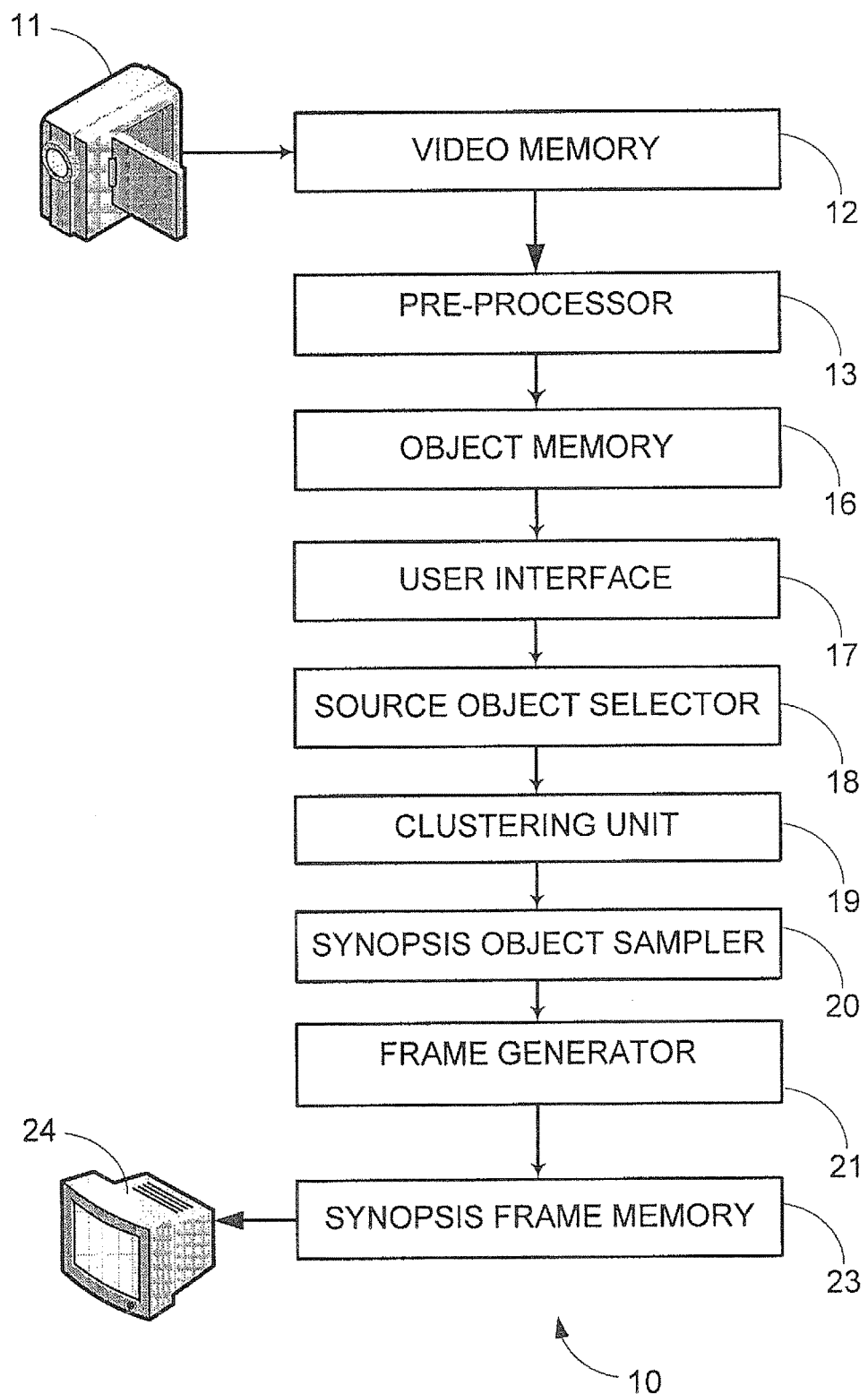
FIG. 7 is a block diagram illustrating a system according to some embodiments of the present invention.

FIG. 7 depicts a block diagram illustrating a system according to some embodiments of the present invention. The system may include a video memory 12 configured to obtain a source video possibly from a video capturing device 11 containing a plurality of source objects. A preprocessor 13 is configured to extract source objects from the source video and store them on object memory 16. A user interface 17 may allow users to select source objects and receive, using source object selector 18 features descriptive of at least some of the source objects. Clustering unit 19 is configured to cluster the source objects into clusters, each cluster including source objects that are similar in respect to one of the features or a combination of the features and to obtain relevance level of the clustered source objects, respectively. A synopsis object sampler 20 is configured to generate synopsis objects by sampling respective clustered source objects. A frame generator 21 is configured to generate a synopsis video having an overall play time shorter than the overall play time of the source video, by determining a play time for each of the synopsis objects, based at least partially on the respective relevance level, wherein two or more synopsis objects which are played at least partially simultaneously in the synopsis video are generated from source objects that are captured at different times in the source video, wherein two or more synopsis objects which are played at different times in the synopsis video are generated from source objects that are captured at least partially simultaneously in the source video. The synopsis video may be then stored on a synopsis frame memory 23 and displayed over display 24.

Figure 8:
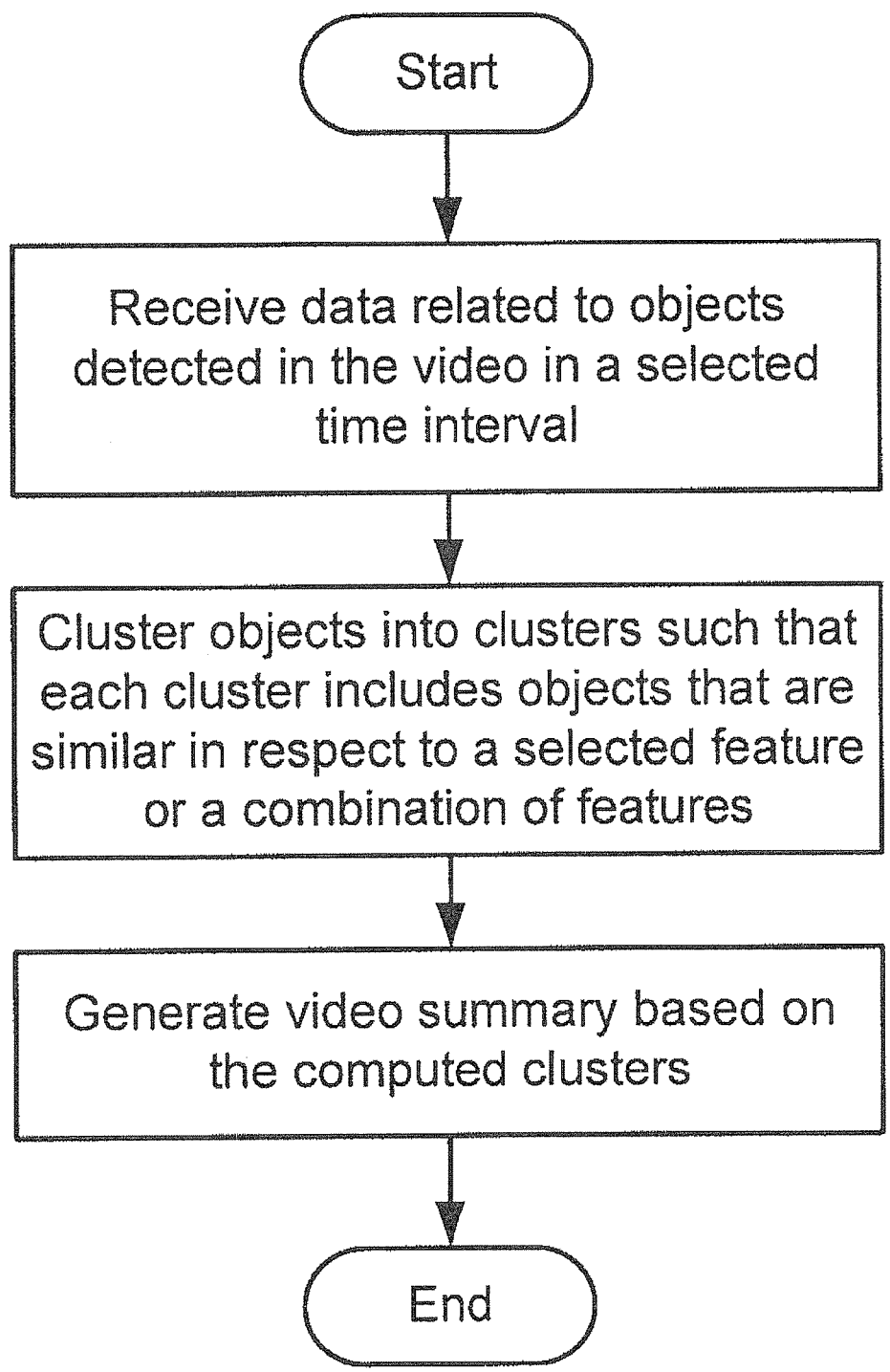
FIG. 8 is a flowchart diagram illustrating a method according to some embodiments of the present invention.

FIG. 8 depicts a flowchart illustrating a method according to some embodiments of the present invention. The method may include obtaining a source video containing a plurality of source objects; receiving features descriptive of at least some of the source objects; clustering the source objects into clusters, each cluster including source objects that are similar in respect to one of the features or a combination of the features; obtaining relevance level of the clustered source objects, respectively; generating synopsis objects by sampling respective clustered source objects; generating a synopsis video having an overall play time shorter than the overall play time of the source video, by determining a play time for each of the synopsis objects, based at least partially on the respective relevance level, wherein two or more synopsis objects which are played at least partially simultaneously in the synopsis video are generated from source objects that are captured at different times in the source video, wherein two or more synopsis objects which are played at different times in the synopsis video are generated from source objects that are captured at least partially simultaneously in the source video.

It is understood that everything said in this invention regarding to objects can also be applied to subsets of frames. A subject of frames can be marked as relevant (or irrelevant) by a user or an automatic classifier, and other subsets of frames can get a relevance (or irrelevance) measure based on their similarity to the selected subsets of frames. After relevant has been determined to subsets of frames, they can be played, instead of their chronological order, according to their order of relevance.

It is understood everything described herein regarding to user selecting of interesting activities of objects is also relevant when an automatic classifier can detect an object or an activity as relevant or irrelevant. It will also be understood that the system according to the invention may be a suitably programmed computer. Likewise, some embodiments of the present invention contemplate a computer program being readable by a computer for executing the method according to embodiments of the invention. Some embodiments of the present invention further contemplate a machine-readable memory tangibly embodying a program of instructions executable by the machine for executing the method according to some embodiments of the present invention.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:
    obtaining a source video containing a plurality of source objects;
    receiving features descriptive of at least some of the source objects;
    clustering the source objects into clusters, each cluster including source objects that are similar in respect to one of the features or a combination of the features;
    obtaining relevance level of the clustered source objects, respectively;
    generating synopsis objects by sampling respective clustered source objects; and
    generating a synopsis video having an overall play time shorter than the overall play time of the source video, by determining a play time for each of the synopsis objects, based at least partially on the respective relevance level,
    wherein two or more synopsis objects which are played at least partially simultaneously in the synopsis video, are generated from source objects that are captured at different times in the source video, and
    wherein said relevance level indicates a distance, on a feature space, between a synopsis object and said received features descriptive of at least some of the source objects.

2. The method according to claim 1, wherein the determining of the play time for each of the synopsis objects, based on the respective relevance level is carried out such that synopsis objects having a higher relevance level are presented earlier than synopsis objects having a lower relevance level.

3. The method according to claim 1, wherein the determining of the play time for each of the synopsis objects, based on the respective relevance level is carried out such that clusters having a higher relevance level are presented earlier than clusters having a lower relevance level.

4. The method according to claim 1, wherein the features descriptive of at least some of the source objects comprise: at least one of: appearance; and activity of the objects.

5. The method according to claim 4, wherein said appearance comprises at least one of: colors of the objects and size of the objects, and wherein said activity comprises at least one of: a velocity of the objects, speed and direction of the objects, and a path of the objects.

6. The method according to claim 1, wherein the relevance level of the clustered source objects is determined relating to a query.

7. The method according to claim 6, wherein the query is provided by a user.

8. The method according to claim 6, wherein the relevance level of the clustered source objects is determined by similar means used in generating the clusters.

9. The method according to claim 1, wherein at least one cluster is determined by a similarity of source objects to a set of features selected by a user.

10. The method according to claim 9, wherein a set of selected features is determined by the user by pointing to a sample of one or more source objects having desired features.

11. The method according to claim 1, wherein said determining of a play time for each of the synopsis objects is further based on relevance cost which favors a display of more relevant objects before less relevant objects.

12. A system comprising:
a video memory configured to obtain a source video possibly from a video capturing device containing a plurality of source objects;
a preprocessor configured to extract source objects from the source video and store them on object memory;
a source object selector configured to obtain features descriptive of at least some of the source objects;
a clustering unit configured to cluster the source objects into clusters, each cluster including source objects that are similar in respect to one of the features or a combination of the features and to obtain relevance level of the clustered source objects, respectively;
a synopsis object sampler configured to generate synopsis objects by sampling respective clustered source objects; and
a frame generator configured to generate a synopsis video having an overall play time shorter than the overall play time of the source video, by determining a play time for each of the synopsis objects, based at least partially on the respective relevance level, wherein two or more synopsis objects which are played at least partially simultaneously in the synopsis video, are generated from source objects that are captured at different times in the source video, wherein said relevance level indicates a distance, on a feature space, between a synopsis object and said received features descriptive of at least some of the source objects.

13. The system according to claim 12, wherein the determining of the play time for each of the synopsis objects, based on the respective relevance level is carried out such that synopsis objects having a higher relevance level are presented earlier than synopsis objects having a lower relevance level.

14. The system according to claim 12, wherein the determining of the play time for each of the synopsis objects, based on the respective relevance level is carried out such that clusters having a higher relevance level are presented earlier than clusters having a lower relevance level.

15. The system according to claim 12, wherein the features descriptive of at least some of the source objects comprise: at least one of: appearance; and activity of the objects.

16. The system according to claim 12, wherein the relevance level of the clustered source objects is determined relating to a query.

17. The system according to claim 16, wherein the query is provided by a user.

18. The system according to claim 16, wherein the relevance level of the clustered source objects is determined by similar means used in generating the clusters.

* * * * *